United States Patent Office 3,476,843
Patented Nov. 4, 1969

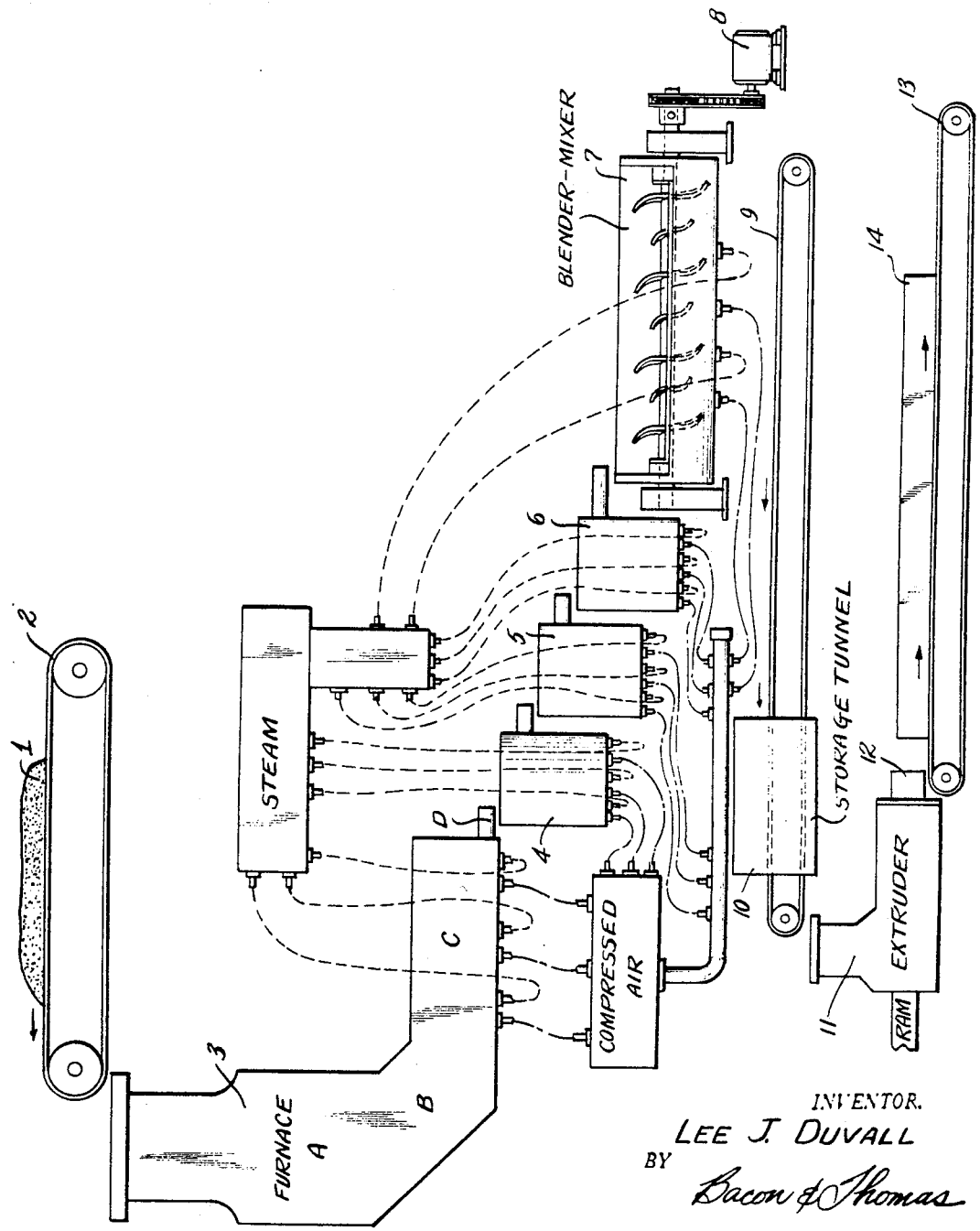

3,476,843
PREPARATION OF LIGHTWEIGHT ROCK
PRODUCTS
Lee J. Duvall, 1855 Trevilian Way,
Louisville, Ky. 40205
Filed Mar. 23, 1967, Ser. No. 625,338
Int. Cl. B29b 3/02, 5/04
U.S. Cl. 264—43                    13 Claims

ABSTRACT OF THE DISCLOSURE

Process for conversion of natural rock aggregate without the use of binders into shaped monolithic rock products suitable for construction purposes or the like, comprising heating the natural rock material to a temperature well above its melting point, subjecting the molten rock to controlled temperature and flow conditions until it has reached a predetermined plastic consistency and then forming the mass into a desired monolithic shape. Gases may be introduced into the molten rock while it is being subjected to said controlled temperature and flow conditions to provide a cellular product and/or additives such as coloring agents, streaking agents, unfused particles and the like may be added and mixed into the molten mass to form cellular or non-cellular monolithic products of enhanced value.

BACKGROUND OF THE INVENTION

This invention is directed to the formation of structurally suitable materials from stone or rock which when taken from its natural state is unsuitable for various reasons. During the quarrying of various igneous and/or sedimentary stone or rock, various layers sometimes possess defects which render them either structurally unsuitable, for example, when the stone possesses a loose strata or a crack or is unattractive because of stains which have permeated the rock. To date, these stones have been suitable only for such purposes as aggregates for cement, or in the formation of building blocks where the aggregates are cemented together to produce the blocks.

The present invention has as one of its purposes the transformation of these quarry culls, into forms which are not only usable but also suitable for applications where blocks composed of the particular stone have found limited use because of their inherently high weight. Economically the products produced by the invention have very distinct advantages as is readily evident when the weight per cubic foot of these materials is compared to those of the standard products.

Another purpose of the invention is to reconstitute natural rock or stone into products which render the rock suitable for applications where originally it could not or would not normally be used.

It should be pointed out that the starting materials used in the present invention are those stones and rocks as they are found to exist in their natural state. They are to be distinguished from slag, which, realistically, is a man-made product since it is a bi-product obtained in the production of iron and steel.

The prior art has proposed various treatment for slag in an attempt to convert this material into structurally usable forms. However, the products produced from slag, although quite suitable for some purposes, do not have the attractiveness and the overall strength which renders them suitable as either a primary building or a decorative material.

SUMMARY OF THE INVENTION

The process of the invention generally can result in the transformation of igneous and sedimentary rock into a form which is considerably less in weight per cubic foot than a comparably sized form of said rock when it is quarried from its source while still maintaining its natural beauty or the process can result in the reconstitution of aggregate stone or rock into a form which permits its use in application for which it was originally unsuited.

When light-weight forms of the rock are desired the process generally entails melting aggregates of the natural rock. At the melting stage the temperature of the mass is maintained slightly below the boiling point of the primary constituent of the chemical constituents which compose the rock but considerably higher than the melting point of the rock. As in the case of granite, silica ($SiO_2$) is always the primary constituent and since it melts between 1670° and 1730° C. and its boiling point is in the vicinity of 2230° C., a temperature 100 to 200° less than its boiling point, for example 2050° C., can be used. When the mass has attained a temperature such as 2050° C., in accordance with one embodiment, air and steam are injected into the mass until there has been a substantial reduction in weight per cubic foot. The decrease in weight is due to the incorporation of gas cells which are obtained when the air and the steam expand upon contact with the mass at the high temperature.

When the mass attains a particular weight per cubic foot, it is poured from the melting zone into another zone which is somewhat lower in temperature.

By using a temperature considerably above that which is necessary to melt the rock, a low viscosity, generally below about 30 cps. and conveniently in the vicinity of about 2 cps., is insured therefore allowing the steam and the air to be easily injected into the mass. Because the mass is of low viscosity, its pouring from the melting zone to the second zone heated to a predetermined temperature is easily accomplished. Since the distance of the melting zone from the second heated zone may be from 1 to 6 feet, the splash which results from the pouring will effect the incorporation of additional air into the mass. The temperature of the mass decreases somewhat because of the injection of the steam and air and the pouring, and therefore, will be within the required temperature range of the second zone. Although the second zone and the zones which follow will have little to do in adding heat to the mass, they will insure that the temperature of the mass does not fall below that temperature specified for that stage of the process.

The mass is again injected with air and steam and after a predetermined weight per cubic foot is attained the mass is poured into a third zone maintained at a particular temperature where again it is injected with air and steam. The number of times that the molten mass can be treated in this manner, of course, depends upon the ultimate weight per cubic foot of stone that is desired. I have discovered that three separate zones in addition to the melting zone and a heated blender-mixer zone (to be discussed) can serve quite effectively in the preparation of the rock product. Using the aforementioned process the weight per cubic foot of granite, for example, can be reduced from 165 to approximately 60 to 80 pounds per cubic foot.

After the mass has progressed through a number of cycles as described above, the mass exhibits plasticity, or more descriptively, body or stiffness, since it has cooled to a certain extent. The mass is then poured from the last zone into a blending and mixing zone which is also heat controlled and possesses jet inlets for air and steam. Since the mass is still quite fluid, air and steam are injected during mixing. The temperature of the mass at this point will be in the vicinity of 900° and 1300° C. During this stage, colors, extending agents and foaming agents may be added to the mass as deemed necessary or desired.

The mass now in plastic form is transferred or poured from the mixer and carried to a heat-controlled zone. The heat in this zone is adjusted so as to maintain the plastic mass in a "soft" condition until it is shaped; for example, by molding by extrusion. The softness or viscosity of the mass must be such that it is sufficiently stiff or of sufficient viscosity so as to not lose its shape or dimension upon being extruded upon transporting device moving at a speed comparable to the extrusion speed.

The extruded rock is then allowed to fully harden and, if necessary, cut to the desired dimensions.

It is obvious from the foregoing that many modifications to the process can be made. Those skilled in the art will be able to make such adjustments as may be necessary for rock of different composition. As is well known, igneous and sedimentary rocks, although they belong to the same family, may possess different percentages of chemical constituents depending primarily on the area from which the respective rocks have been taken. For example, granite is found in all parts of the earth and there is some fluctuation in the percentage of its chemical constituents. Granite always has a high percentage of silica ($SiO_2$) which ranges from 45 to 90%. The alumina ($Al_2O_3$) content can range from between 3 to 20% and ferric oxide ($Fe_2O_3$) may be present in concentrations of from .5 to 4%. Likewise, the ferrous oxide (FeO) present in the granite may be within a range of 1% to 7% while lime (CaO) may be present in a concentration of from 1–6%. In this regard note for example Annual Report Smithsonian Institute, 1908, pp. 279–287; Geological Survey Bulletin, 1878, pp. 16, 17, 24, 25, 28 and 29 and Technical Papers, Bureau of Standards, vol. 21, No. 344, Dept. of Commerce, 1927, pp. 548–553.

Consequently, it can be seen that various modifications may sometime be necessary. For example, in order for the process as above described to be capable of handling all the various rocks found in nature, it must have a flexibilty in temperature and mechanical adjustments. The melting zone must be capable of melting and flowing CaO which melts at 2570° C. and boils at 2850° C. Therefore, this zone should be capable of heating to a temperature of at least 3000° C. Although, as above stated, the temperature utilized with a typical granite may be only slightly over 2000° C., it might be necessary, if a particular granite contained a relatively high percentage of CaO, to perhaps increase the temperature somewhat closer to the boiling point of the $SiO_2$. This increase in temperature might be necessary in order to insure proper fluidity of the molten material as it is treated, transferred or poured. Actually it is difficult to ascertain the melting point of refractory bodies such as stone or rock since a reference to any Handbook of Physics will clearly point out that these materials are said not to possess a melting point in the strict sense but rather a flow point wherein the concentration of the solids is such so as to allow the material to flow. Therefore, as earlier stated modifications might be necessary and the artisan after familiarizing himself with applicant's general concept would know what changes would be necessary.

The word rock as used throughout this specification is meant to include granite, marble, limestone, clay, sand and gravel as they exist in nature. Although the above process requires that the rock be added to the melting zone in aggregate form, it is obvious that it may be added in any size depending of course upon the dimensions and capabilities of the zone. The use of the aggregate form is preferred since this form permits the process to be easily and more efficiently operated.

The process as described above lends itself well to either a continuous process or to a batch process. If a batch process is desired, one charge of the aggregates is added to the melting zone and after it has reached the proper temperature is made to go through the sequence. A second charge then may be added to the melting zone. In the case of a continuous process, when the material has reached the outlet of the melting zone, it has attained the desired temperatures and will flow from this zone to and through the remaining zones and then to the mixing and blending zone. The addition of the aggregate, therefore can be continuous, thus establishing a continuous process.

According to the above desribed method low grade rock and stone, for example, low grade granite and low grade marble can be transformed into useful and acceptable grades of materials. With respect to granite the most outstanding feature of the end product is in the specific use of this material as a building block. Granite customarily used in construction normally has a weight per cubic foot of 165 lbs. A comparably sized piece of granite made according to one embodiment of the invention would weigh in the vicinity of 60 to 80 lbs. per cubic foot. Because granite possesses a high weight per cubic foot it is not normally used in the upper floors of taller buildings where slabs could be used in ceilings, floors and the halls where the architects would most likely like to use it. Therefore, the granite as produced by this embodiment because of its low weight can be used in applications where ordinary granite block or slab were prohibited because of its high weight. In addition, because of the air cells which are entrapped in the rock as produced by this embodiment of the instant invention, the material lends itself well for insulation purposes.

With respect to the decorative characteristics of the instant products, the products themselves possess the natural beauty of the stone from which the aggregates were obtained, however, other effects can be obtained by the addition of certain materials. For example, if granite chips, as used in terrazzo floors and measuring from ⅜ to 1¼ inches in diameter are added to the mass while in the mixer-blender, the final product will have an effect similar to that as found in natural form for conglomerate. In addition, if emery powder is added to the mass in the mixer-blender just prior to the shaping stage, black streaks can be simulated. In a like manner, if iron oxide is added, red streaks can be simulated. Other decorative effects can be obtained by utilizing combinations of emery and iron oxide.

As earlier stated, the number of times the molten mass is transferred and injected with air and steam is dependent upon the particular weight and structural requirements for the final product.

Along this same line, it should be pointed out that the weight per cubic foot of granite or marble need not be lowered to an appreciable extent. Injection with air and/or steam can be omitted. The process of the invention contemplates in its broadest form the conversion of quarry culls which are generally unsuitable except as before stated into highly useful building and decorative materials, in effect, reconstituted natural rock in shaped monolithic form.

If the cull has, for example, a crack or stain which renders it useful only as an aggregate for cement, the cull may be crushed and processed according to the invention with the elimination of the air and steam steps and cutting down the distance of the pour in order to obtain a granite or marble, which, except for the weight lost by melting, will approximate the weight of natural marble or granite. The granite and marble will as a result of the process be free of the defects which rendered them initially unusable. These reconstituted stones can be given color and/or streaks by adding materials late in the mixing stage as described above.

BRIEF DESCRIPTION OF THE DRAWING

The sole figure of the drawing is a schematic diagram of representative apparatus which can be used in carrying out the process of the invention.

DETAILED DESCRIPTION OF THE DRAWING

Referring now to the drawing, there is shown a conveyor system 2 which may be any conventional system which will transport natural rock to furnace 3.

Furnace 3 may be any conventional furnace which is used for the melting of iron, brass, etc. It should be capable of producing heat in the temperature range of approximately 3000° C. These furnaces are well known in the art and have internal structures which, because they must attain temperatures which are very high, are built accordingly. These furnaces are normally heated electrically.

The furnace is preferably of a type which allows aggregates which are introduced therein to be heated sequentially rather than being initially subjected to the high temperatures necessary for their melting. The furnace, shown in the drawing, has three individual areas A, B and C. Area A, in the case of granite, will have a temperature ranging around 1650° C. In area B, the temperature increases to approximately 2000° C. and in area C the aggregates, which after having progressed through A and B have a more fluid consistency, are heated to approximately 2100° C. The furnace as shown by the drawing conventionally has in the section designated as C inlets for the injection of steam and air. Although only three inlets for each have been shown by the drawing, it is obvious that the number can be changed according to the worker's discretion.

Furnace 3 also contains an outflow gate designated as D. The purpose of D, of course, is to allow the flow of the molten mass into the following ladle. Ladles 4, 5 and 6 are conventional in design, that is, although they are called ladles they are characterized more by the fact that they are similar to melting furnaces. These ladles which are also electrically heated have flow valves which permit the transfer of the mass from one ladle to the other and eventually to blender-mixer 7. Although the ladles according to the drawing are shown to be relatively close to each other, the ladles should be constructed and positioned so as to be easily moved both horizontally and vertically and so as to be easily tilted to pour. According to the instant process is is preferable to have the ladles arranged so that ladle 4 can be moved vertically from 1 to 6 feet away from the furnace gate. Ladle 5 should be positioned so that it can be moved vertically 1 to 8 feet away from ladle 4 and likewise ladle 6 is positioned in such a way that it can be moved on the vertical plane of from 1 to 12 feet away from ladle 5.

As will be noted from the drawing each of the ladles, like the furnace, contains inlets which permit the injection of air and steam.

Mixer-blender 7 is heat controlled and also has inlets for air and steam injection. The blender-mixer 7 is shown to be chain driven by motor 8. The blender-mixer 7 can be of the blade type with a center shaft, the center of which is also the center of the body of the mixer-blender, this allows the material to be dumped while the blades are in motion.

Preferably one side of the blender-mixer 7 is high, while the other is lower with a shelf. Conventionally, the blender-mixer 7 should operate in two ways; in a continuous flow operation, the blender-mixer merely continues to mix by rotation of the mixer blades. As the material fills the tub, the mixed material will ooze out over the spout or shelf and fall onto the conveyor 9. In a batch type operation, the batch is poured in from the ladle above and the material is mixed until it is homogeneous and has the desired color. When the mass has attained the desired temperature, blender-mixer 7 is tilted on its axis and the material is dumped onto conveyor 9.

Conveyor 9 may be of any conventional type with the stipulation of course that it be so constructed as to be able to carry material which possesses a temperature in the vicinity of 1800° C. The conveyor 9 passes into a storage or holding tunnel 10 of a conventional type which will maintain the material transferred at a temperature which permits its eventual extrusion. The storage or holding tunnel 10 may be similar to the furnaces commonly used for firing stoneware, vitreous china etc. The tunnel 10 is generally electrically heated but must be such that it is capable of heating to temperature as high as 1500-2000° C.

Conveyor 9 then dumps the material into extruder 11 of conventional design capable of handling materials which have temperatures in the order of 1800° C. Although the extruder 11 is shown to be a ram-type extruder, it is obvious that it can be a screw or spiral type extruder so long as it does have the capacity to extrude materials at relatively high temperatures.

The extruder 11 is fitted with a die which can be heat controlled or cooled according to the worker's particular needs. A conventional conveyor system 13 receives extruded material from the die 12. This conveyor 13 is designed to travel at a comparable speed to the extrusion rate of the extruder and must be capable of transporting extruded products of relatively high temperatures. An extruded product 14 is shown on conveyor 13.

DESCRIPTION OF PREFERRED EMBODIMENTS

The following examples represent several embodiments of the invention but applicant does not intend his invention to be limited thereto.

EXAMPLE 1

Crushed granite material (designated as 1 in the drawing) from ½" to 1¼" in size and weighing approximately 165 lbs. per cubic foot is fed into the top of the furnace 3 by means of conveyor 2. The chemical constituents of the granite are as follows:

|  | Percent |
|---|---|
| $SiO_2$ | 72.73 |
| $Fe_2O_3$ | .83 |
| $Al_2O_3$ | 15.53 |
| CaO | 4.31 |
| FeO | 1.12 |
| MgO | .72 |
| $K_2O$ | .49 |
| $Na_2O$ | 2.17 |
| $H_2O$ | 1.25 |
| Traces of others | 1.25 |

By feeding the material into the top of furnace 3, the heat of section A of the furnace preheats the crushed granite before it reaches the melting point near the lower section of the furnace. The temperature of the furnace rises into three areas of consideration, the last being A which is maintained at a temperature of 1650° C. The silica ($SiO_2$) in the granite melts in this section and therefore gives a creep or flow to the material. The second area (B), being at approximately 2050° C., increases the flow of the material thus transforming the aggregates into a molten mass.

The lower area C of the furnace is held at approximately 2050° C. to 2130° C. which produces a free flowing molten mass having a viscosity of less than 30 cps. since alumina ($Al_2O_3$) melts at 2050° C. and $SiO_2$ boils at 2230° C. Both air and steam are injected into this free flowing molten granite at a rate of 1 cubic foot of air and 1 cubic foot of steam for every 5 cubic feet of mass. The rate of injection is moderate in order to keep the injected gas and vapor within the mass.

The injection of air and steam causes cells to form in the molten material. It is especially desirable for the air and the steam to be injected near the gate D of the furance. The mass containing the entrapped air and steam is then allowed to flow into ladle 4 causing additional air cells to form due to splashing. The distance the material falls from furnace 3 to ladle 4 is approximately 3 feet The temperature of material in ladle 4 is held between 1800° C. and 2000° C. Air and steam are injected into the molten material until a weight of between 110 lbs. and 130 lbs. per cubic foot is reached. The mass is then permitted to drop a distance of approximately 4 feet into the next lower ladle, ladle 5.

The temperature of the molten granite in ladle 5 is held between 1720° C. and 1800° C. which insures a free flow of the material and also allows air and steam to be easily injected into the molten mass. Again, air and steam are injected into the molten granite until a weight of between 90 lbs. and 110 lbs. per cubic foot is reached. The mass is then permitted to drop a distance of 6 feet into ladle 6.

Ladle 6 is identical in design with ladles 4 and 5, but the temperature of the mass in the third ladle is held between 1630° C. and 1720° C. The mass is still in a liquid state and therefore air and steam can still be injected into it.

Air and steam are injected into the molten granite until a weight of between 60 and 80 lbs. per cubic foot is reached. The mass then is allowed to flow into blender-mixer 7.

By manipulation of the air and steam injection, the temperature of the mass in the blender-mixer is lowered to between 900° C. and 1300° C. which in turn gives the mass body or plasticity.

At this point, colors, extenders and foaming agents can be added as desired.

The granite material, now in a plastic form, is transferred to conveyor 9 by means of which it is moved into heat-controlled tunnel 10. The heat in the tunnel is adjusted so as to keep the plastic mass in a "soft" condition until it is dumped into extruder 11. The "softness" or viscosity of the mass depends upon the cross section of the extruded form and in all cases upon being extruded it must be sufficiently stiff or of a high viscosity so as not to lose its shape or dimension upon being extruded onto conveyor 13, which moves at the same speed as the speed of the extrusion.

The plastic mass is then transferred from the storage tunnel into extruder 11. The mass is extruded through die 12 to produce a structure depicted as 14 in the drawing.

The temperature of the mass at extrusion is in the vicinity of the temperature at which the aggregate initially softens. For example, although the granite of the present example starts to melt at 1650° C., it is actually soft after being maintained at a temperature of from 1230° to 1250° C. Therefore, the mass can be extruded quite readily. The temperature and pressure at the extruder will depend upon the sectional shape and dimensions of the extruded piece. The pressure of the ram can go as high as 3000 p.s.i. as in the case of hydraulic operated ram and would be comparatively low in the case of a screw or gear operated ram or a spiral type of extruder. Extruding machines are available in all sizes and capacities and can be adapted to this process or modified for the process.

The extruded product 14 is carried along by conveyor 9 and stored until it is rigid enough to be cut to size for the end product. Depending upon the quality of the product, the final product, if necessary, can be cut by several methods, i.e. by slicer blade, by wire slicer or by saws. Although the extruded granite is shown as a straight block, the process and the nature of the granite permits extrusion of such in forms having curved surfaces and forms similar to the conventional cinder and cement blocks.

The extruder which is shown in the drawing as a ram type is equipped with a removable die 12. Since die 12 can be heated electrically, the die can produce a melt on the outer surface of the extruded product to thereby give the extruded piece a "skin" or smooth surface. When a rough textured surface is desired, a "cold" die can be used.

EXAMPLE 2

The process of Example 1 is repeated except that no steam or air is introduced into the molten granite in either the furnace, ladles or blender. Emery powder and/or iron oxide is introduced into the blender to introduce decorative effects. The mass is then extruded as in Example 1.

EXAMPLE 3

The process of Example 1 is repeated except that granite chips measuring from 3/8 to 1¼ inches in diameter are added to the mass during its mixing in the blender-mixer. The mass is then extruded according to Example 1 to obtain a form possessing a terrazzo type surface.

EXAMPLE 4

The process of Example 3 is repeated except that in addition to the marble chips, emery powder is also added to the mass.

In carrying out the process of the invention I have used "weight per cubic foot" as the frame of reference particularly after the molten rock has been injected with air and steam. Although the molten material, which has entrapped cells does possess a viscosity, I have found that the use of weight per cubic foot is much more accurate since the mass takes on a false viscosity. As the surface tension of each cell tends to hold back the flow of the mass it also effects the normal methods of measuring viscosity, therefore accurate and consistent viscosity measurements cannot always be obtained. The determination of the weight per cubic foot eliminates the above-mentioned attendant variables and therefore, yields a more accurate and more uniform measurement guide.

Having thus described my invention, it is clear that numerous modifications and substitutions can be made thereto without departing from the concept of the invention. Therefore, it is intended that these modifications and substitutions be included within the scope of my invention.

I claim:
1. A process for treating natural rock aggregate selected from the group consisting of granite, marble, limestone, clay, sand and gravel comprising:
    (a) heating said natural rock aggregate in a first heating zone to a temperature higher than the melting point of said rock but below the boiling point of the primary constituent of the chemical constituents which compose said rock to form said rock into a molten mass and passing air and steam into said molten mass to cause the formation of cells within said molten mass to thereby reduce its weight per unit volume;
    (b) sequentially pouring said molten mass from said first heating zone into a second heating zone, from said second heating zone into a third heating zone and from said third heating zone into a fourth heating zone to create additional cells within said molten mass, air and steam being passed into said molten mass to reduce its weight per unit volume at each of said second, third and fourth heating zones, the temperature of said second heating zone being lower than the temperature of said first heating zone, the temperature of said third heating zone being lower than the temperature of said second heating zone and the temperature of said fourth heating zone being lower than the temperature of said third heating zone;
    (c) pouring said mass from said fourth heating zone into a heating and mixing zone, the temperature of which is lower than said fourth heating zone but sufficiently high to maintain the mass in the state of plasticity suitable for shaping and mixing said mass while passing air and steam into said mass to further reduce the weight per unit volume of said mass; and
    (d) shaping said mass to produce a desired form.

2. A process according to claim 1 wherein the shaping of step (d) is performed by extrusion.

3. A process according to claim 2 wherein the extrusion is performed through a warm die so as to give the form a smooth surface.

4. A process according to claim 2 wherein the extrusion is performed through a cold die so as to give the form a rough surface.

5. A process according to claim 1 wherein the mass of step (c) is transferred to a controlled heating zone which insures that the mass is not cooled below that temperature at which shaping can be performed.

6. A process for the preparation of a cellular granite product which comprises:
   (a) heating crushed natural granite to a temperature ranging from 2050° C. to 2130° C. for a time sufficient to obtain a fluid molten mass having a viscosity not greater than 30 cps.;
   (b) injecting air and steam in the amount of about 1 cubic foot of each for every 5 cubic feet of mass;
   (c) pouring said mass a distance of approximately 3 feet into a second heated zone whose temperature is between about 1800° to 2000° C. and when said mass is in said zone, injecting air and steam into said mass until the mass attains a weight of between 110 to 130 pounds per cubic foot;
   (d) pouring said mass a distance of about 4 feet into a heated zone whose temperature ranges from about 1720° to 1800° C. and after said mass is in said zone injecting air and steam into said mass until the mass attains a weight of between about 90 and 110 pounds per cubic foot;
   (e) pouring said mass a distance of about 6 feet into a heated zone whose temperature ranges from about 1630° to 1720° C. and when said mass is in said zone, injecting air and steam into said mass until it attains a weight of from about 60 to 80 pounds per cubic foot;
   (f) allowing said mass to flow into a heated area and mixing said mass while injecting air and steam therein until the mass exhibits body and plasticity and reaches a temperature of from 900 to 1300° C.;
   (g) transferring said mass while maintaining said mass at a temperature which permits its shaping without subsequent substantial loss of dimension after shaping to an area for shaping said mass; and
   (h) shaping said mass into a desired form.

7. A process according to claim 6 wherein the mass is shaped by extrusion.

8. A process according to claim 7 wherein the extrusion is conducted through a warm die to give the product formed thereby a smooth outer surface.

9. A process according to claim 7 wherein the extrusion is conducted through a cold die to give the product formed thereby a rough outer surface.

10. A process according to claim 1 wherein the natural rock aggregate is granite and said rock is heated in step (a) to a temperature 100 to 200° C. below the boiling point of silica, the primary constituent of the chemical constituents of said rock.

11. A process according to claim 10 wherein said rock is heated to 2050° C. in step (a).

12. A process according to claim 10 wherein the granite is heated to a temperature from 2050 to 2130° C. in step (a), the temperature of the second heating zone is about 1800 to 2000° C., the temperature of the third heating zone is about 1720 to 1800° C. and the temperature of the fourth heating zone is about 1630 to 1720° C.

13. A process according to claim 12 wherein air and steam are injected into the granite in the second heating zone until the mass attains a weight of 110 to 130 pounds per cubic foot, air and steam are injected into said granite in the third heating zone until said mass attains a weight of 90 to 110 pounds per cubic foot and air and steam are injected into said granite in the fourth heating zone until said mass attains a weight of 60 to 80 pounds per cubic foot.

References Cited

UNITED STATES PATENTS

| 1,610,460 | 12/1926 | Mallery | 264—42 |
| 1,890,798 | 12/1932 | Warren | 106—86 |
| 2,052,324 | 8/1936 | Thompson | 264—42 |
| 3,235,351 | 2/1966 | Powell | 264—43 |
| 3,396,043 | 8/1968 | Winterburn | 106—40 |

FOREIGN PATENTS

| 546,645 | 7/1942 | Great Britain. |

DONALD J. ARNOLD, Primary Examiner

U.S. Cl. X.R.

106—88, 122; 264—148